United States Patent [19]

Wolf

[11] Patent Number: 4,543,519

[45] Date of Patent: Sep. 24, 1985

[54] METHOD AND APPARATUS FOR STOPPING A RAPIDLY ADVANCING FILAMENT

[75] Inventor: Horst Wolf, Albershausen, Fed. Rep. of Germany

[73] Assignee: Zinser Textilmaschinen GmbH, Ebersbach, Fed. Rep. of Germany

[21] Appl. No.: 175,922

[22] Filed: Aug. 6, 1980

[30] Foreign Application Priority Data

Aug. 7, 1979 [DE] Fed. Rep. of Germany ....... 2931930

[51] Int. Cl.$^4$ .............................................. H02P 3/18
[52] U.S. Cl. ................................... 318/759; 318/760; 318/773
[58] Field of Search ......... 318/760, 759, 761, 770–777

[56] References Cited

U.S. PATENT DOCUMENTS

| | | | |
|---|---|---|---|
| 2,393,998 | 2/1946 | Mahnke | 318/773 |
| 2,677,087 | 4/1954 | Willmott | 318/760 |
| 3,584,278 | 6/1971 | Krabbe | 318/777 |
| 3,860,093 | 1/1975 | Mitsui et al. | 318/771 |
| 4,145,645 | 3/1979 | Price et al. | 318/777 |

Primary Examiner—David Smith, Jr.
Attorney, Agent, or Firm—Karl F. Ross; Herbert Dubno

[57] ABSTRACT

A strand-advancing system, particularly for a drawing frame, has an asynchronous electric motor powered from an alternating-current source and having a plurality of separate windings forming separate poles. This motor has a rotary output speed directly related to the advance speed of the filament. During normal operation the motor is driven at a relatively high nominal speed by connecting a relatively small group of its poles to the alternating-current source. The strand advance is stopped by first simultaneously disconnecting the relatively small group of poles from the alternating-current source and connecting a relatively large group of the poles to the source to operate the motor hypersynchronously generator-fashion for a relatively short time. Then the relatively large group is disconnected from the alternating-current source and the small group is energized with direct-current voltage until the motor and strand stop.

12 Claims, 2 Drawing Figures

METHOD AND APPARATUS FOR STOPPING A RAPIDLY ADVANCING FILAMENT

FIELD OF THE INVENTION

The present invention relates to a system for rapidly advancing a fiber band (sliver) of cotton, wool, synthetic or other textile fibers, hereinafter referred to as filament, and to a method of and apparatus for stopping the filament, particularly in a drawing frame.

BACKGROUND OF THE INVENTION

In drawing and spinning systems wherein sliver or roving is drawn, spun, doubled or twisted while being longitudinally stretched it is standard procedure to operate at extremely high speeds. Frequently the linear advance speed is well above 350 m/min, normally well above 500 m/min. This advance speed is established by one or more pairs of pinch rollers that engage all the strands pulled from their supplies at a distance downstream from all of these supplies, a distance frequently as small as 1 m.

If one of the strands breaks or one of the supplies runs out, it is essential to be able to stop the advance before the insufficiently plied portion of the strand reaches the advance rollers.

It is therefore standard procedure to use motors which incorporate heavy-duty mechanical brakes. When such a motor is de-energized the brake automatically acts and arrests the drive element contacting the yarn very rapidly.

Such a system has the considerable disadvantage that, due to its mechanical operation, it is subject to considerable wear and must be serviced frequently. The brake shoes must be changed occasionally and the brake must be adjusted for proper operation at frequent intervals. Even so when the brake becomes relatively worn it is frequently impossible for it to stop the yarn that is advancing within a short enough time to prevent the unplied yarn from entering the advance rollers.

It has also been suggested to drive the advance element for the filament by means of an asynchronous motor. Such a motor is normally powered by alternating current, but can be brought to a relatively rapid halt by powering it with direct current. This is problematic, however, since immediately after stopping of the multiphase alternating current feeding the motor it is necessary to wait a few seconds for the magnetic field to collapse. If this time is not waited before connecting up the power supply for direct current, back voltage can damage the diodes or thyristors used as rectifiers in the arrangement. Since several tenths of seconds must therefore be lost before the field collapses, such an arrangement normally does not act rapidly enough for high-speed systems.

OBJECTS OF THE INVENTION

It is therefore an object of the present invention to provide an improved method of and apparatus for advancing a filament.

Another object is to provide an improved method of operating a filament-advance system which allows the filament to be rapidly brought to a halt by relatively simple means.

A further object is to provide such a system which will have a long service life.

SUMMARY OF THE INVENTION

These objects are attained according to the instant invention in a system wherein the drive element for the filament is itself driven by an asynchronous electric motor having a plurality of separate windings constituting a plurality of separate poles, and subdivided into a small group and a large group. When the large group is powered from an alternating-current source the motor will operate at a relatively low nominal speed, and when the small group is powered from the same alternating-current source it will operate at a substantially higher nominal speed. According to this invention the system is operated normally at the relatively high nominal speed by energization of only the small group, that is the low-pole side of the motor, from the a-c source. For stopping the motor the small group is disconnected from the a-c source and the large group is connected to it, thereby automatically operating the motor hypersynchronously generator-fashion. After a brief period the large group is disconnected from the alternating-current source and the small group is connected to a direct-current source for braking of the motor to a complete halt.

Thus it is possible totally electrically to bring the motor to an extremely rapid halt. When the alternating-current source is switched from the low-pole side to the high-pole side of the motor the motor automatically brakes itself very rapidly down to its low nominal speed. Meanwhile the field of the low-pole side collapses so that when direct-current voltage is applied to this low-pole side the motor rapidly comes to a halt without damage to the rectifiers or other circuit components of the power supplies.

The switchover between these two modes of operation during stopping of the motor can be carried out purely as a function of time, or as a function of motor-operation speed. Thus the control means can include a timer which automatically switches from the one mode to the other after a predetermined time. The control means can alternatively include a tachometer which senses motor operation speed and switches braking modes when a certain operation speed is reached, normally the low nominal speed.

The braking torque from hypersynchronous generator braking increases up until immediately before the relatively low nominal operating speed of the high-pole motor side. The braking torque reaches zero very quickly at this low nominal speed. Since during this hypersynchronous generator braking the field of the low-pole side of the motor collapses very rapidly it is sufficient to disconnect the windings of this low-pole side of the motor completely. It is possible according to this invention to short-circuit the windings of the low-pole side of the motor together during generator-braking of the motor so as even more greatly to enhance the braking effect.

It is possible in a motor having its multiphase windings connected in a Y or star to connect two of the windings in parallel and to apply the direct current to these two windings and the third leg. It is possible then that the direct current will equal approximately one and one-half times the nominal current for the motor with low-pole operation of the motor. Other systems could be used, although this one is particularly applicable due to the high braking torque.

SPECIFIC DESCRIPTION

Figure 1:
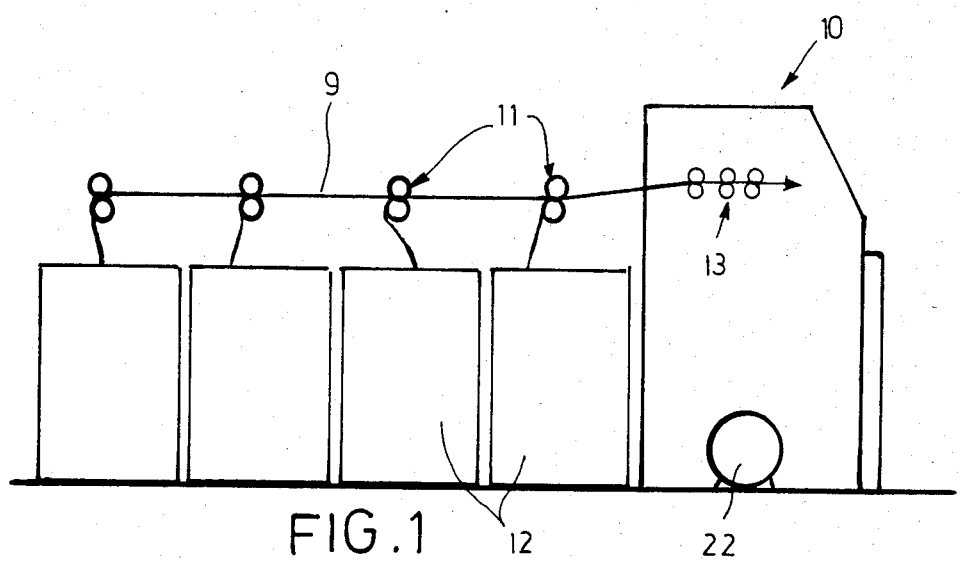
FIG. 1 is a side view of a drawing frame according to the instant invention.

As seen in FIG. 1 a plurality of filaments 9, here rovings, are pulled by a drawing creel 10 through respective pairs 11 of rollers from respective supplies 12. To this end the drawing apparatus has a plurality of pinch rollers 13 operated by an asynchronous motor 22. The filaments 9 are drawn from their supplies 12 at a speed of at least 350 m/min, normally between 500 m/min and 600 m/min. From the drawing apparatus 10 the combined filaments 9 are passed to a spinning device of standard construction or to a storage container.

The roller pairs 11 are spaced from the downstream end of the roller assembly 13 by distances of at most 1 m. They are drawn out by a factor of six so that it is necessary to be able to stop the advance in at most 0.72 seconds to prevent an insufficiently plied combined filament from finding its way into the drawing frame 13.

The motor 22 has a ratio of pole numbers of at least 3:1, preferably 4:1. In accordance with the instant invention the asynchronous motor therefore is a 2/8 pole asynchronous motor of the squirrel-cage rotor type. It is possible to use a commutator-type motor but such use is normally avoided to save costs. The motor 22 according to the instant invention is set to operate on three-phase current from an input line 36 constituting an alternating-current voltage source and has separate windings for the separate sets of poles.

Figure 2:
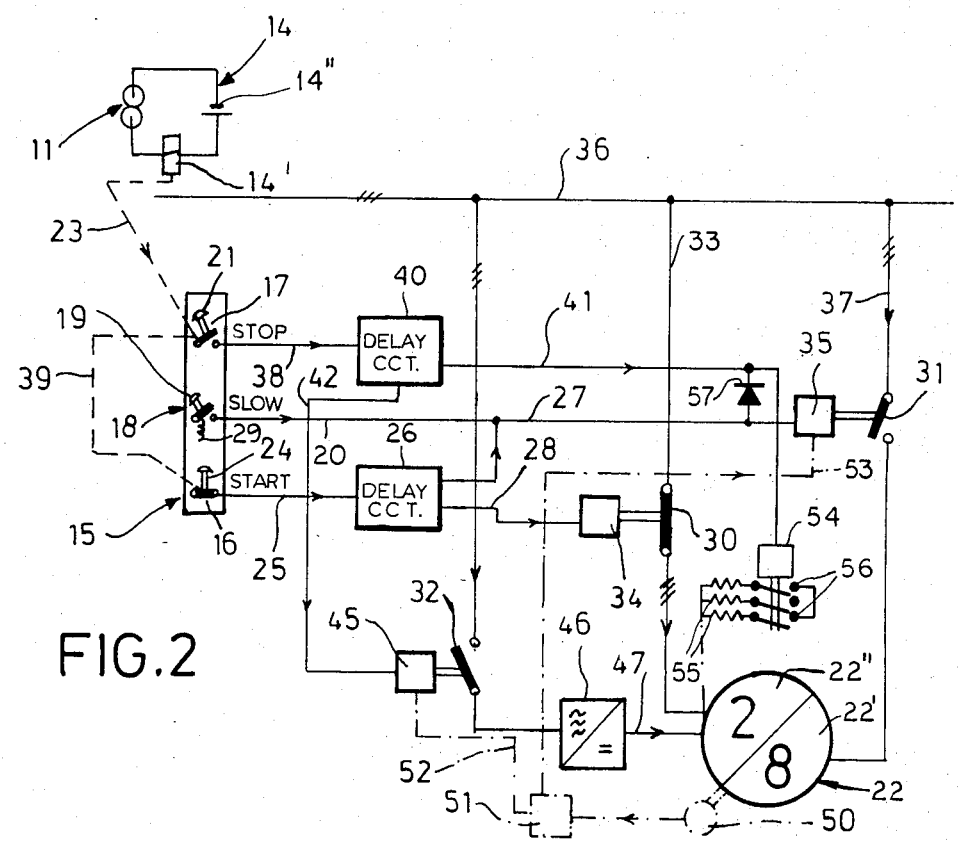
FIG. 2 is a schematic diagram of the system for carrying out the method of the instant invention.

Each of the pairs of rollers 11 as shown in FIG. 2 is connected in a circuit 14 including a relay 14' and a power source 14" so that when a filament 9 is not between these rollers 11 they contact each other to close the circuit and operate the relay 14' which is connected as shown schematically at 23 with a stop switch 17 of a switching arrangement 15. This stop switch 17 can be operated by hand by means of a button 21 and is ganged as indicated at 39 with a start switch 16 that can itself be operated by means of a button 24. In addition the switching arrangement 15 includes a slow switch 18 having a button 19 and a spring 29 that normally holds it open.

The motor 22 has a high-pole side 22' with eight poles and a low-pole winding side at 22" with only two poles. It is here operated from the three-phase line 36 either via a line 37 and a relay controlled switch 31 for the high-pole side 22' or via a line 33 and a relay switch 30 for the low-pole side 22". It is also possible as will be described below to operate the low-pole side 22" via direct-current voltage from a line 47.

The start switch 16 is of the maintain-contact type and is operated manually by depressing the button 24, which action also automatically opens the stop switch 17. It is connected via a line 25 to a delay circuit 26 having one output 27 that is energized immediately as its input 25 is energized and another output 28 which is energized with some delay after energization of the input 25. More particularly when the input 25 is energized a voltage appears immediately in the line 27 to close the relay 31, thereby starting the motor 22 by means of the high-pole side 22' to start the motor 22 operating at low speed. After a short time the line 27 is deenergized so as to open the switch 21 and the line 28 is energized so as to operate the relay 34 and close the switch 30. This action feeds the three-phase voltage from the line 36 to the low-pole side 22" so as to operate the motor 22 at its nominal speed. At this speed the filaments 9 are normally drawn at a rate of approximately 500 m/min.

In the event that one of the filaments 9 breaks the respective rollers 11 will short out and energize the respective relay 14' to close the stop switch 17 and simultaneously open the start switch 16. It is also possible to simultaneously close the stop switch 17 and open the start switch 16 by pressing the manual-operation button 21. This feeds a voltage via the input 38 to another delay circuit 40 having inputs 41 and 42 comparable to the outputs 27 and 28 of the delay circuit 26. Opening of the start switch 16 immediately, without delay, open-circuits the relay 34 and opens the switch 30. Also without delay voltage is fed via the line 41 to the relay 35 to close it and operate the motor 22 generator-fashion so as to brake its rotation with considerable torque, simultaneously generating voltage which is fed back into the line 36. After a short time delay the circuit 40 deenergizes the line 41 and energizes the output 42, thereby feeding voltage to a relay 45 controlling a switch 32 connected between the three-phase source 36 and a full-wave rectifier 46 constituting a direct-current voltage source and whose output is the line 47 connected to the side 22". This delay ensures that the motor 22 will be braked with considerable force until it reaches a relatively slow speed, simultaneously de-exciting its windings and allowing the magnetic field to collapse so that when direct-current voltage is fed in via the line 47 the rectifiers of the full-wave rectifier 46 will not be damaged. In practice with the system according to the instant invention the rotation speed of the motor 22 is reduced to approximately one-quarter of its nominal speed by the generator braking with the switch 31 closed so that the subsequent braking by feeding d-c voltage into the low-pole winding side 22" will be effective to bring it extremely rapidly to a halt.

The slow switch 19 has an output line 20 connected directly to relay 31. The switch is closed by the operator of the machine after a filament break to operate the motor 22 at low speed so as to ensure proper feeding of the various filaments 9. When closed the switch 18 therefore causes the motor 22 to be operated at low speed by its high-pole side 22', and when open the motor coasts simply to a halt from this low speed. Thus the switch 18 is used purely for testing purposes.

It is possible to eliminate the delay circuit 40, connecting its input line 38 directly to the output 41 connected to the relay 35. Instead a tachometer 50 may be incorporated in the motor 22 in the manner described in *Servo-Mechanism Practice* by Ahrendt and Savant (McGraw-Hill: 1960) at p. 298 ff. The tachometer 50 is connected to an operating circuit 51 connected via lines 52 and 53 to the relays 45, 35 and 45, respectively. This tachometer 50 generates a direct-current voltage which is directly proportional to the rotation speed of the motor 22. The circuit 51 detects the level of this voltage and simultaneously opens the relay 35 and closes the relay 45 when the speed of the motor 22 drops below the synchronous or nominal speed of the high-pole side 22' of the motor 22. Thus the switchover from generator-fashion braking to d-c braking is made speed-dependent rather than time-dependent.

It is also possible according to the instant invention to provide a three-pole relay 54 connected via resistors 55 to the windings of the low-pole side 22" and to connect the back contacts 56 of this relay 54 together so that when it closes these windings are connected together to a load so as further to add to the braking effect and to stop the motor 22 even more rapidly. This relay 54 is operated from the immediate-response line 41 of the delay dircuit 40, an isolating diode 57 being provided to prevent operation of the relay 54 by the switch 19 or the output 27. The resistors 55 could, of course, be replaced by heavy-duty condensors.

Thus with the system according to the instant invention the motor 22 will be brought to a stop extremely rapidly. The combination of generator and d-c braking on the respective high-pole windings and low-pole windings ensures this rapid braking under all circumstances. As friction is not relied on at all the device will require no adjustment and can be counted on to have a long service life.

I claim:

1. A method of operating a filament-advancing system wherein an asynchronous electric motor powered from an alternating-current source and having a plurality of separate windings forming separate poles has a rotary output speed directly related to the advance speed of the filament, said method comprising the steps of:
   normally driving said motor at a relatively high nominal speed by connecting a relatively small group of poles to said source; and
   stopping the advance of said filament by
   substantially simultaneously disconnecting said relatively small group of said poles from said source and from any other source and connecting a relatively large group of said poles to said source to operate said motor hypersynchronously generator-fashion for a relatively short time, and
   thereafter disconnecting said relatively large group of poles from said source and energizing said small group with direct-current voltage until said motor stops.

2. The method defined in claim 1, further comprising the step of bringing said motor from a stop up to said high nominal speed by
   connecting only said larger group of said poles to said source until said motor is operating at a relatively low nominal speed; and
   thereafter substantially simultaneously disconnecting said large group from said source and connecting said small group to said source.

3. The method defined in claim 1 wherein said relatively short time is the time it takes said motor to slow from said relatively high nominal speed to a predetermined switchover speed.

4. The method defined in claim 3 wherein said switchover speed is the nominal operating speed of said motor when powered only from said source by said large group.

5. A system for advancing a filament, said system comprising:
   a drive element engaging said filament and rotatable to advance same at a filament-advance speed;
   an asynchronous electric motor connected to said element and having a plurality of separate windings forming a plurality of separate poles subdivided into a large group and separate therefrom a small group;
   an alternating-current source;
   a direct-current source; and
   control means connected to said sources and to said motor for normally driving said motor at a relatively high nominal speed by connecting said small group to said a-c source, and for stopping the advance of said filament by disconnecting said small group from said a-c source and from any other source and substantially simultaneously connecting said large group to said a-c source and thereafter disconnecting said large group from said a-c source and substantially simultaneously connecting said small group to said d-c source.

6. The system defined in claim 5 wherein when said large-group only is connected to said a-c source said motor operates at a relatively low nominal speed.

7. The system defined in claim 6 wherein said control means includes timer means for establishing a predetermined period for operation of said motor with said small group disconnected from said a-c source and said large group connected to said a-c source before disconnection of said large group and connection of said small group to said d-c source.

8. The system defined in claim 6 wherein said control means includes tachometer means for sensing when said motor is operating above said low nominal speed and for only allowing said large group to be disconnected from said a-c source and said small group to be connected to said d-c source during stopping of said filament when said motor is operating at most at said low nominal speed.

9. The system defined in claim 5 wherein said large group includes at least three more poles than said small group.

10. The system defined in claim 5, further comprising means effective in said control means during stopping of said filament for interconnection of the windings of said small group via impedances while said large group is connected to said a-c source.

11. The system defined in claim 5, further comprising means in said control means for energizing said large group only from said a-c source during testing of the filament advance.

12. The system defined in claim 5, further comprising means in said control means for starting-up said motor for first energizing said large group from said a-c source and for thereafter disconnecting said large group from said a-c source and connecting said small group to said a-c source.

* * * * *